US008719461B2

(12) United States Patent
Kim (10) Patent No.: US 8,719,461 B2
(45) Date of Patent: *May 6, 2014

(54) APPARATUS AND METHOD FOR CONTROLLING USB SWITCHING CIRCUIT IN PORTABLE TERMINAL

(71) Applicant: Samsung Electronics Co. Ltd., Suwon-si (KR)

(72) Inventor: Soon Do Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,762

(22) Filed: Jan. 28, 2013

(65) Prior Publication Data

US 2013/0138838 A1 May 30, 2013

Related U.S. Application Data

(63) Continuation of application No. 12/607,054, filed on Oct. 27, 2009, now Pat. No. 8,412,861.

(30) Foreign Application Priority Data

Oct. 30, 2008 (KR) .................. 10-2008-0106916

(51) Int. Cl.
*G06F 3/00* (2006.01)
*G06F 13/00* (2006.01)
(52) U.S. Cl.
USPC ............ 710/15; 710/2; 710/5; 710/8; 710/11
(58) Field of Classification Search
None
See application file for complete search history.

(56) References Cited

U.S. PATENT DOCUMENTS

| 5,828,864 | A | 10/1998 | Danknick et al. |
| 6,725,061 | B1 | 4/2004 | Hutchison et al. |
| 6,904,488 | B2 | 6/2005 | Matsumoto et al. |
| 7,711,870 | B2 | 5/2010 | Yoshida et al. |
| 7,863,865 | B2 | 1/2011 | Hussain et al. |
| 2005/0114580 | A1 | 5/2005 | Ede |
| 2006/0046788 | A1 | 3/2006 | Oh |
| 2006/0080476 | A1* | 4/2006 | Wang et al. ...................... 710/15 |
| 2006/0288150 | A1 | 12/2006 | Jang et al. |
| 2008/0005366 | A1 | 1/2008 | Raatni et al. |
| 2008/0148083 | A1 | 6/2008 | Pesavento et al. |
| 2008/0272741 | A1* | 11/2008 | Kanamori ...................... 320/137 |

(Continued)

FOREIGN PATENT DOCUMENTS

| KR | 10-2003-0061564 A | 7/2003 |
| KR | 10-2006-0131489 A | 12/2006 |
| WO | 2005/004148 A1 | 1/2005 |

*Primary Examiner* — Scott Sun
(74) *Attorney, Agent, or Firm* — Jefferson IP Law, LLP (57) ABSTRACT

An apparatus and method for automatically switching the operation mode of a switching circuit in a portable terminal are provided. If an external device is connected to a connector interface unit, a signal is detected from the connector interface unit. The type of external device is identified by the detected signal. If the identified external device is a communication device, a communication mode is activated and a signal path is established between an internal module and the external device during the communication mode. A determination is made as to whether an internal event occurs in the portable terminal and an external event occurs in the external device, during the communication mode. The mode of the connector switching circuit is switched to a sleep mode if the internal and external events have not occurred.

18 Claims, 4 Drawing Sheets

(56) References Cited

U.S. PATENT DOCUMENTS

| | | | |
|---|---|---|---|
| 2009/0009187 A1 | 1/2009 | Kwak | |
| 2009/0128091 A1* | 5/2009 | Purdy et al. | 320/106 |
| 2010/0033018 A1* | 2/2010 | Fukasawa et al. | 307/80 |
| 2010/0257286 A1* | 10/2010 | Hanson et al. | 710/16 |

* cited by examiner

APPARATUS AND METHOD FOR CONTROLLING USB SWITCHING CIRCUIT IN PORTABLE TERMINAL

PRIORITY

This application is a continuation of prior application Ser. No. 12/607,054 filed on Oct. 27, 2009, which claims the benefit under 35 U.S.C. §119(a) of a Korean patent application filed in the Korean Intellectual Property Office on Oct. 30, 2008 and assigned Serial No. 10-2008-0106916, the entire disclosure of which is hereby incorporated by reference.

BACKGROUND OF THE INVENTION

1. Field of the Invention

The present invention relates to portable terminals. More particularly, the present invention relates to an apparatus and method that can identify which type of external device is connected to a portable terminal, and can control operations according to the path.

2. Description of the Related Art

In recent years, portable terminals have been developed that are capable of storing a variety of application programs, thereby increasing their versatility. One example of a portable terminal is a mobile communication terminal that can provide communication services. Since its introduction, the mobile communication terminal and its corresponding communication services have increased rapidly in popularity.

Historically, the portable terminals were relatively heavy in weight and large in size in order to accommodate the battery and electronic parts installed therein. However, the trend has been to reduce the weight, size, and thickness of the portable terminals as technology related to electronic parts and batteries develops.

Portable terminals have a recharging mode and a communication mode. They recharge their battery in recharging mode and perform data communication in a communication mode. They allow for the connection of a terminal adapter to be operated in a recharging mode. They can also be connected to external devices and thus communicated therewith in a communication mode.

The portable terminals can be connected, via a data cable, with the terminal adaptor to charge their battery or with external devices to perform data communication. To this end, the portable terminals are equipped with a connector interface unit for connecting to the data cable. The connector interface unit is connected to the terminal adaptor and supports Universal Serial Bus (USB) communication.

The connector interface unit of the portable terminal includes a limited number of pins. On the other hand, external devices are increasing in type, which are intended to be connected to the portable terminal via the connector interface unit. Therefore, cases frequently occur where the different types of external devices use the same alignment of pins allocated to the connector interface unit so that they may be connected to the portable terminal.

Although the portable terminal must operate differently according to the type of external device connected thereto, the portable terminal is connected to different types of external devices via the same alignment of pins allocated to its connector interface unit. The use of the same alignment of pins may, however, cause a serious problem to the control circuit of the portable terminal or the external devices. Therefore, a method and apparatus is required to correctly identify the type of external device connected to a portable terminal and, accordingly, control the portable terminal based on the identified external device.

SUMMARY OF THE INVENTION

An aspect of the present invention is to address the above-mentioned problems and/or disadvantages and to provide at least the advantages described below. Accordingly, an aspect of the present invention is to provide a method and apparatus that can identify a type of external device connected to a portable terminal, and, accordingly, control the portable terminal according to the identified external device.

The present invention further provides a method and apparatus that can identify the type of external device connected to a portable terminal, and control a signal processing operation in order to allow the portable terminal to be operated in a communication mode according to the identified external device.

The present invention further provides a method and apparatus that can detect an event that occurs on a connection path between a portable terminal and an external device, and control an operation mode in a Universal Serial Bus (USB) switching circuit according to the detected event.

The present invention further provides a method and apparatus that can control an operation mode in a USB switching circuit according to a signal transmission/reception state between a portable terminal and an external device connected to the portable terminal, thereby reducing the consumption of electric power according to the connection of the external device.

The present invention further provides a method and apparatus that can switch a current mode into a sleep mode in a USB switching circuit of a portable terminal, if a signal, transmitted/received between the portable terminal and an external device connected to the portable terminal, is not detected, thereby reducing the consumption of electric power in the USB switching circuit.

The present invention further provides a method and apparatus that can adaptively control the switching operation between sleep and active modes in a USB switching circuit in a portable terminal, according to the detection of a signal transmitted from an external device, thereby reducing the electric power consumed even though the portable terminal does not communicate with the external device connected thereto.

The present invention further provides a method and apparatus that can allow a USB switch circuit in a portable terminal to consume low power.

The present invention further provides a method and apparatus that can adaptively switch between a sleep mode and an active mode in a USB switch circuit in a portable terminal, according to the detection of the signal transmitted from an external device.

In accordance with an aspect of the present invention, an apparatus for controlling a switching circuit in a portable terminal is provided. The apparatus includes a connector interface unit, connected with an external device, for transmitting signals between the portable terminal and the external device, a switching circuit for one of connecting and disconnecting signal lines with the connector interface unit to respectively one of establish and break a signal path between the external device and a corresponding internal module used to perform data communication, a signal detector for detecting a signal generated upon the external device being connected to the connector interface unit, to output a first detected value corresponding to the detected signal, and for detecting an external event from the external device while the external device is connected to the connector interface unit and the portable terminal is operated in the communication mode with the external device, to output a second detected value corresponding to the detected external event, and a controller for identifying a type of the external device according to the first detected value upon the external device being connected to the connector interface unit, for activating the communication mode of the portable terminal with the external device according to the identified type of the external device, and for switching between at least active and sleep modes of the switching circuit according to the second detected value while the external device is connected to the connector interface unit and the portable terminal is operated in the communication mode with the external device, wherein, during the active mode, the signal path between the external device and the corresponding internal module is established, and during the sleep mode, the signal path between the external device and the corresponding internal module is broken.

In accordance with another aspect of the present invention, a method for controlling a switching circuit in a portable terminal is provided. The method includes detecting, upon an external device being connected to a connector interface unit, a signal from the connector interface unit and identifying a type of external device according to the detected signal, activating a communication mode according to the detected signal, and establishing a signal path between an internal module and the external device during the communication mode while the external device is connected to the connector interface unit, determining whether at least one of an internal event occurs in the portable terminal and an external event occurs in the external device, during the communication mode while the external device is connected to the connector interface unit, and switching from an active mode of a switching circuit to a sleep mode of the switching circuit if at least one of the internal and external events has not occurred, wherein, during the active mode, the signal path between the internal module and the external device is established, and during the sleep mode, the signal path between the internal module and the external device is broken.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, a method for identifying a type of external device connected to a portable terminal and an apparatus adapted to the method are described below. The portable terminal, according to an exemplary embodiment of the present invention, can support a mode for recharging the battery, which is called a recharging mode, and a communication mode for data communication. The portable terminal is equipped with a connector interface unit. The connector interface unit serves to be connected with a terminal adaptor and supports communication of the portable terminal.

In an exemplary embodiment of the present invention, the interface for supporting the recharging mode and the communication mode may be Universal Serial Bus (USB). The connector interface unit is implemented with a USB interface unit. It should be understood that the present invention is not limited to this exemplary embodiment. Accordingly, the communication, supported by the USB interface unit, also refers to USB communication.

In the following description, external devices connected to the connector interface unit of the portable terminal are a terminal adaptor and a USB device. It should be, however, understood that the present invention is not limited to this exemplary embodiment. It will be appreciated that, only if the external devices can connected to the portable terminal via the USB interface unit, they may be applied to all information communication devices, multimedia devices, and their applications, such as, a desktop computer, a laptop computer, a Personal Digital Assistant (PDA), an MP3 player, a game player, a digital broadcast receiver, a wireless communication module, an external memory, a headset, etc.

In the following description, an apparatus and method will be explained that identifies the types of USB devices and controls the operation mode and the signal processing in the USB switching circuit according to the identified USB device. However, a detailed description about a communication mode by a recharging mode of the terminal adaptor will be omitted.

In an exemplary embodiment of the present invention, although the portable terminal is described based on a mobile communication terminal with a wireless communication module, it should be understood that the present invention is not limited to this exemplary embodiment. For example, the portable terminal may include any type of terminal that has a connector interface unit for allowing for the connection of external devices, for example, a USB interface unit, and can support corresponding functions of the external devices connected thereto via the USB interface unit. Therefore, it will be appreciated that the portable terminal according to exemplary embodiments of the present invention can be applied to all information communication devices, multimedia devices, and their applications, such as, a mobile communication terminal, a digital broadcast receiver, a PDA, a smart phone, a Moving Picture Experts Group-1 Audio Layer 3 (MP3) player, a laptop computer, etc.

In the following description, based on the connection to the portable terminal, a connector interface unit, and an external device, the configuration and operation of an exemplary embodiment of the present invention according to the present invention is explained, with reference to the accompanying drawings.

Figure 1:
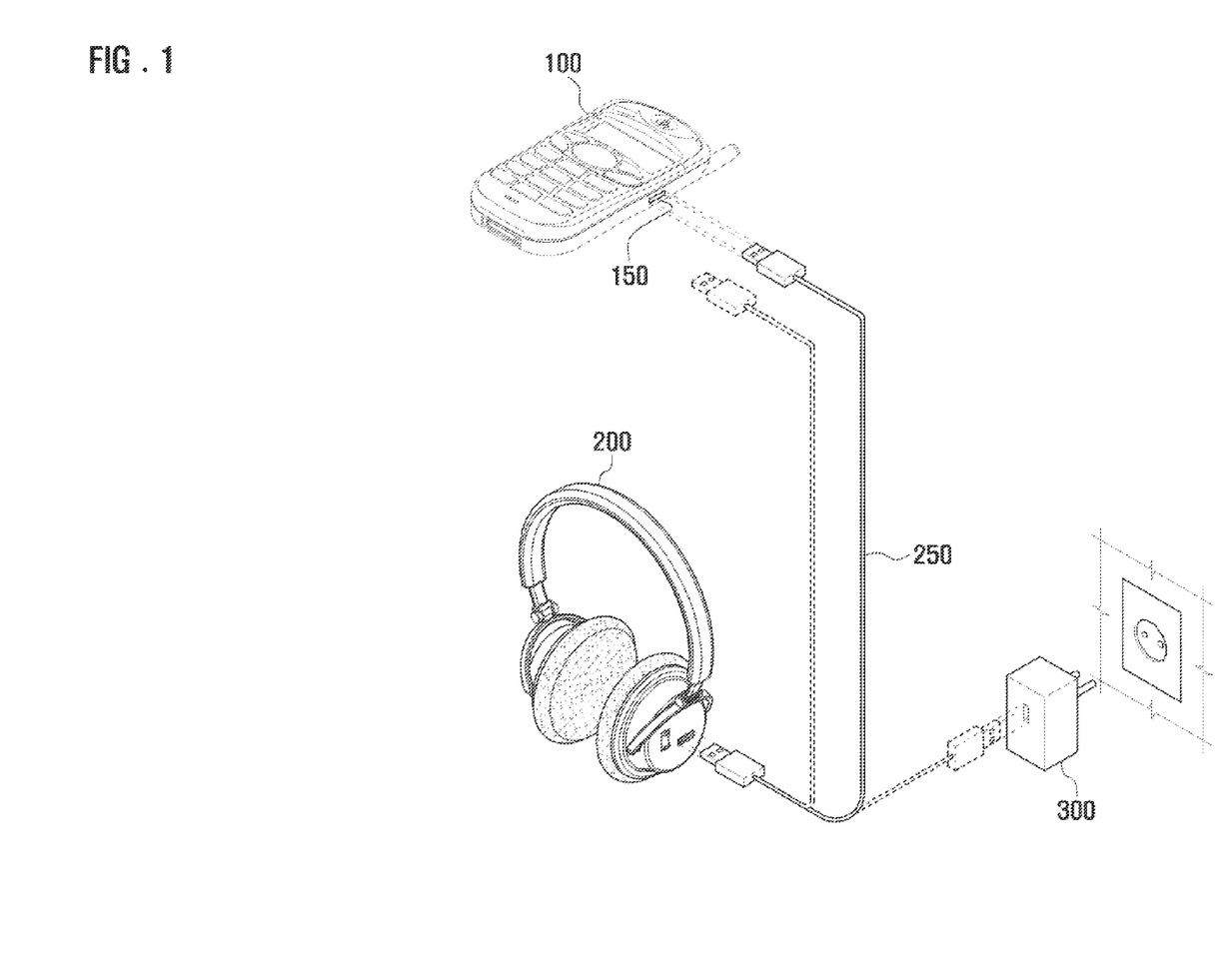
FIG. 1 is a view illustrating a connection among a portable terminal and external devices, according to an exemplary embodiment of the present invention.

FIG. 1 is a view illustrating a connection among a portable terminal and external devices, according to an exemplary embodiment of the present invention. The external devices refer to USB devices that can be connected to a connector interface unit (USB interface unit) of the portable terminal, for example, a terminal adaptor and a headset as shown in FIG. 1. The portable terminal can identify a type of external device connected thereto via the USB interface unit, the terminal adaptor and headset, and thus support a corresponding function according to the identified external device.

Referring to FIG. 1, the portable terminal 100 is connected to external devices (200 and 300) via a data cable 250, where the external devices are a headset 200 and a terminal adaptor 300. The data cable 250 refers to a USB data cable. The headset 200 and the terminal adaptor 300 are each capable of being connected to the data cable 250.

When the portable terminal 100 is connected to the headset 200 or the terminal adaptor 300 via the data cable 250, the portable terminal 100 detects a signal from the connection and determines whether the detected signal (for example, a peak value of the detected signal) corresponds to the headset 200 or the terminal adaptor 300.

The portable terminal 100 may also detect an identification signal transmitted from the headset 200 or the terminal adaptor 300 via the data cable 250, and determine whether the headset 200 or the terminal adaptor 300 is connected thereto according to the identification signal. For example, external devices (200, 300) may have unique identification numbers, respectively, and transmit identification signals corresponding to the identification numbers to the portable terminal 100 when they are connected to the portable terminal 100.

In an exemplary embodiment of the present invention, it is assumed that the data cable 250 is used to supply electric power from the terminal adaptor 300 to the portable terminal 100 to recharge the battery, and also to transmit signals between the portable terminal 100 and the headset 200 during the data communication.

The portable terminal 100 is also equipped with a USB interface unit 150 to which external devices are connected, and performs corresponding control operations according to the type of external device connected thereto.

If the headset 200 or the terminal adaptor 300 is connected to the USB interface unit 150, the portable terminal 100 detects a signal transmitted from the connected device. The portable terminal 100 identifies the type of device connected to the USB interface unit 150, based on the detected signal. After that, the portable terminal 100 performs a corresponding operation with the identified device.

For example, if the portable terminal 100 determines that it is connected with the headset 200 via the USB interface unit 150, the portable terminal 100 can process signal transmission/reception for data communication with the headset 200 in a communication mode. On the other hand, if the portable terminal 100 identifies that it is connected with the terminal adaptor 300, the portable terminal 100 can use electric power, supplied from the terminal adaptor 300, to recharge the battery according to a battery recharging condition in a recharging mode.

When the portable terminal 100 is connected with a USB communication device via the USB interface unit 150, the portable terminal 100 activates a communication mode. In the communication mode, the portable terminal 100 receives a signal or stored information transmitted from the USB communication device or transmits a signal or stored information, generated in the portable terminal 100, to the USB communication device. For example, if the USB communication device is a headset 200, the portable terminal 100 activates a communication mode and detects an audio signal from the headset 200 or transmits an audio signal, generated in the portable terminal 100, to the headset 200.

On the other hand, if the portable terminal 100 is connected with a terminal adaptor 300 as an external device, the portable terminal 100 identifies the terminal adaptor 300 and activates a recharging mode. In the recharging mode, the portable terminal 100 recharges the battery using electric power supplied from the terminal adaptor 300. The terminal adaptor 300 is configured in such a way that one of its ends is connected to the USB interface unit 150 of the portable terminal 100 via the data cable 250 and its other end is plugged in an electric power receptacle.

The terminal adaptor 300 transforms a high voltage of commercial electrical power of the receptacle into a certain level of voltage for the portable terminal 100. The commercial electrical power may be Alternating Current (AC) electrical power. In order to rapidly recharge a battery of the portable terminal 100, the terminal adaptor 300 may supply electric power to the battery of the portable terminal 100 using a maximum rated current within an allowable margin to the portable terminal 100 and its battery.

The headset 200 is connected to the portable terminal 100 via the data cable 250, and performs data communication with the portable terminal 100 via the USB interface unit. A more detailed description regarding the connection between the headset 200 and the portable terminal 100, via the USB interface unit, will be explained further below.

The data cable 250 is configured to include a first connector connected to the portable terminal 100, a second connector connected to the headset 200 or the terminal adaptor 300, and a cable for connecting the first connector to the second connector. The first and second connectors are shaped to be connected to the USB interface units of the headset 200 and the terminal adaptor 300, respectively. If the external device is the headset 200, the second connector of the data cable 250 is connected to the headset 200.

As described above, the portable terminal 100 is connected with external devices via the data cable 250. In particular, the portable terminal 100 detects a signal transmitted from the USB interface unit of the connected external device and determines whether the connected external device is a headset 200 or a terminal adaptor 300 according to the detected signal. For example, the portable terminal 100 identifies the type of external device based on a signal transmitted from the connected device, and performs a controlling operation for recharging the battery or for data communication, according to the identified external device.

The portable terminal 100 is operated in a recharging mode if it is connected with the terminal adaptor 300 via the USB interface unit 150. On the other hand, the portable terminal 100 is operated in a communication mode if it is connected with the headset 200 via the USB interface unit 150.

The portable terminal 100 performs a control operation corresponding to the identified external device. For example, if the portable terminal 100 is connected with the headset 200 as an external device, the portable terminal 100 can detect the connection of the headset 200. After that, the portable terminal 100 establishes a signal path for a communication mode with the headset 200, and performs a corresponding operation with the headset 200 via the signal path in a communication mode. For example, the portable terminal 100 receives and processes an audio signal from the headset 200 or transmits an audio signal, generated in the portable terminal 100, to the headset 200. For example, the portable terminal 100 transmits/receives audio signals related to voice communication to/from the headset 200. The portable terminal 100 can also transmit audio signals related to the reproduction of music files to the headset 200.

If the portable terminal 100 is connected to a laptop computer (not shown) as an external device, the portable terminal 100 can detect the connection of the laptop computer. After that, the portable terminal 100 establishes a signal path for a communication mode with the laptop computer, and performs a corresponding operation with the laptop computer via the signal path in a communication mode. For example, the portable terminal 100 receives and processes a data signal from the laptop computer or transmits data signals, generated in the portable terminal 100, to the laptop computer. For example, the portable terminal 100 receives/stores data such as an address book, music files, etc. from the laptop computer. The portable terminal 100 can also transmit data, such as an address book, music files, etc., to the laptop computer.

In order to perform the operations as described above, the portable terminal 100 includes a USB switching circuit. The USB switching circuit establishes a signal path with an external device and allows electrical current to continue flowing in the signal path, so that the portable terminal 100 can perform a corresponding operation with the external device in a communication mode.

When the USB switching circuit breaks the signal path (i.e. an OFF state), a signal cannot be transmitted from the external device to the portable terminal 100 and thus the portable terminal 100 should remain in a standby state to receive a signal for data communication from the external device. Therefore, the portable terminal 100 should supply electrical current to the signal path of the USB switching circuit to retain the signal path, irrespective of whether the portable terminal 100 receives a signal from the external device.

In an exemplary embodiment of the present invention, when the portable terminal 100 does not perform data communication with an external device connected thereto, the portable terminal 100 automatically switches the active mode of the USB switching circuit to the sleeping mode, thereby reducing power consumption.

If the portable terminal 100 detects a signal from the external device while the USB switching circuit is in a sleep mode, the USB switching circuit is automatically switched from the sleep mode to the active mode. In an exemplary embodiment of the present invention, according to the communication state with an external device, modes of the USB switching circuit can be automatically switched without a user's operation or an auxiliary device, thereby reducing the power consumption. After that, the portable terminal 100 can be operated in a corresponding mode.

In an exemplary embodiment of the present invention, the portable terminal can reduce power consumption as the USB switching circuit adaptively switches the operation modes. In the following description, a method for reducing power consumption according to the operation of the USB switching circuit and the portable terminal adapted to the method are explained with reference to the accompanying drawings. It should be understood that the present invention is not limited to the following exemplary embodiments. It will be appreciated that there are many modifications of the present invention.

Figure 2:
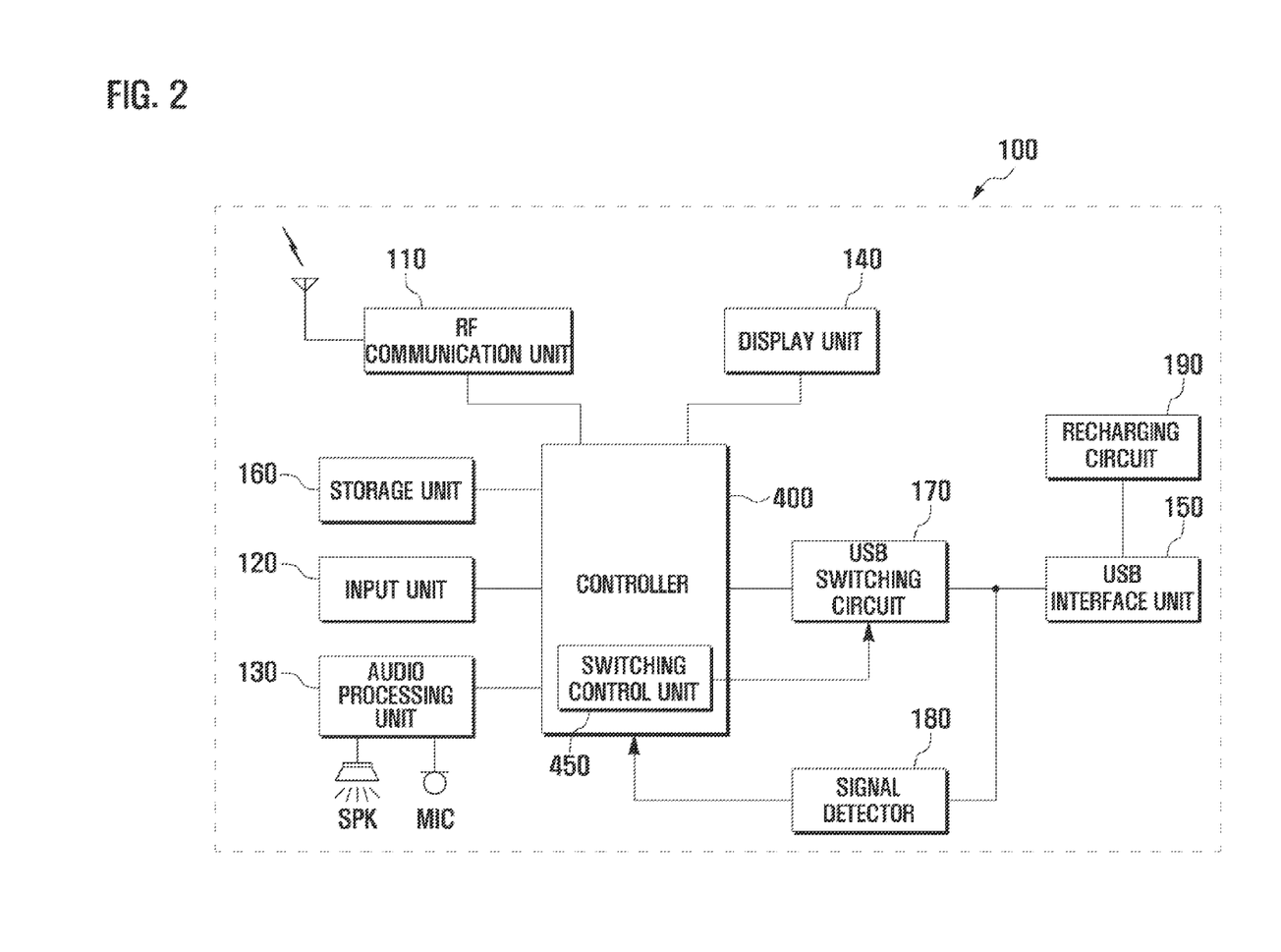
FIG. 2 is a schematic block diagram illustrating a portable terminal according to an exemplary embodiment of the present invention.

FIG. 2 is a schematic block diagram illustrating a portable terminal according to an exemplary embodiment of the present invention.

Referring to FIG. 2, the portable terminal 100 includes a Radio Frequency (RF) communication module 110, an input unit 120, an audio processing unit 130, a display unit 140, a USB interface unit 150, a storage unit 160, a USB switching circuit 170, a signal detector 180, a recharging circuit 190, and a controller 400. The controller 400 includes a switching control unit 450 for controlling an operation mode of the USB switching circuit 170.

The RF communication module 110 allows the portable terminal 100 to perform communication with other entities. The RF communication module 110 establishes a communication channel with an RF network (including a base station) and performs voice communication and data communication there through. The RF communication module 110 is configured to include an RF transmitter for up-converting the frequency of transmitted signals and amplifying the transmitted signals and an RF receiver for low-noise amplifying received RF signals and down-converting the frequency of the received RF signals. The RF communication module 110 may be replaced with an external device connected to the portable terminal 100. For example, if an external device is an RF communication module, which can be connected to an RF network, and is connected to the USB interface unit 150 of the portable terminal 100, the external device can perform communication for the portable terminal 100.

The input unit 120 receives a variety of character information. The input unit 120 also receives signals to set a variety of functions and to control the operations of the portable terminal 100 and outputs them to the controller 400. The input unit 120 may be implemented with a touchpad or further include a separate touch pad, according to the type of portable terminal In addition, according to the type of portable terminal, the input unit 120 may be implemented by one of a touch pad, a touch screen, a keypad of a general key arrangement, a QWERTY keypad, and an input device having function keys for performing particular operations, or a combination thereof.

In an exemplary embodiment of the present invention, when an external device, such as a headset 200, a terminal adaptor 300, etc., is connected to the portable terminal 100, the input unit 120 generates a key signal to control the external device and outputs the key signal to the controller 400. The input unit 120 may be replaced with an external device connected to the portable terminal 100. For example, if the external device is an auxiliary input device for the portable terminal 100, the external device is connected to the portable terminal 100 via the USB interface unit 150 and generates a key signal to control the portable terminal 100.

The audio processing unit 130 reproduces audio signals via a speaker (SPK). The audio processing unit 130 also receives audio signals from a microphone (MIC) and outputs them to the controller 400. For example, the audio processing unit 130 converts audio signals into audible sound signals and outputs them via the speaker (SPK). The audio processing unit 130 also receives audio signals, such as voice sound, etc., via the microphone (MIC), generates digital data, and outputs the audio signals to the controller 400. For example, the audio processing unit 130 converts analog voice signals from the microphone (MIC) into digital voice signals and outputs the digital voice signals to the controller 400. The audio processing unit 130 also converts the digital voice signals into analog voice signals and outputs the analog voice signals via the speaker (SPK).

In an exemplary embodiment of the present invention, when an external device is connected to the portable terminal 100, the audio processing unit 130 generates a signal indicating the connection of the external device and outputs the signal via the speaker (SPK). The audio processing unit 130 may be replaced with an external device. For example, if the external device is a separate audio device, such as a headset 200, etc., and is connected to the portable terminal 100 via the USB interface unit 150, the external device can reproduce audio signals in the portable terminal 100 or collect audio signals and transmit them to the controller 400.

The display unit 140 displays screen data generated while the portable terminal 100 is operating. The display unit 140 can display a user's input information and state information related to key operations. The display unit 140 can also display the function setting information about the portable terminal 100. The display unit 140 can display signals and color information output from the controller 400. The display unit 140 may be implemented with a Liquid Crystal Display (LCD). The LCD may be implemented by a touch screen. In that case, the display unit 140 also may serve as an input device. In an exemplary embodiment of the present invention, an external device may take the place of the function of the display unit 140. For example, if the external device is a laptop computer/image outputting device and is connected to the portable terminal 100 via the USB interface unit 150, the external device can display screen data generated in the portable terminal 100.

The storage unit 160 is configured to include Read Only Memories (ROMs), Random Access Memories (RAMs), etc. The storage unit 160 stores a variety of data generated and used from and by the portable terminal 100. The variety of data includes data generated when application programs are executed in the portable terminal 100, and all the types of data that is generated in the portable terminal 100 or received from external devices.

The storage unit 160 stores application programs for controlling the operations of the portable terminal, for identifying the types of external devices, for cooperating with a corresponding external device, and for switching modes of a USB switching circuit.

The storage unit 160 stores reference data with respect to a variety of external devices that can be connected to the portable terminal 100. The reference data includes a signal generated when the portable terminal 100 detects the connection of the external device. The storage unit 160 may include one or more buffers that can temporarily store data generated when the application programs are executed.

The storage unit 160 may be configured within the portable terminal 100. The storage unit 160 may further include a smart card as an external memory device. It should be understood that the storage unit 160 according to an exemplary embodiment of the present invention includes all internal/external storage media. In an exemplary embodiment of the present invention, the external device may take place of the function of the storage unit 160. If the external device is an external storage medium and is connected to the portable terminal 100 via the USB interface unit 150, the external device can store data generated in the portable terminal 100 and provide corresponding data in response to the request of the controller 400.

The USB interface unit 150 allows for the connection of an external device. The USB interface unit 150 transmits a signal from the controller 400 to the external device via USB communication or outputs a signal, transmitted from the external device via USB communication, to the controller 400. The configuration of the USB interface unit 150 is illustrated in FIG. 3 when the USB interface unit 150 performs a signal transmission according to the USB communication method.

Figure 3:
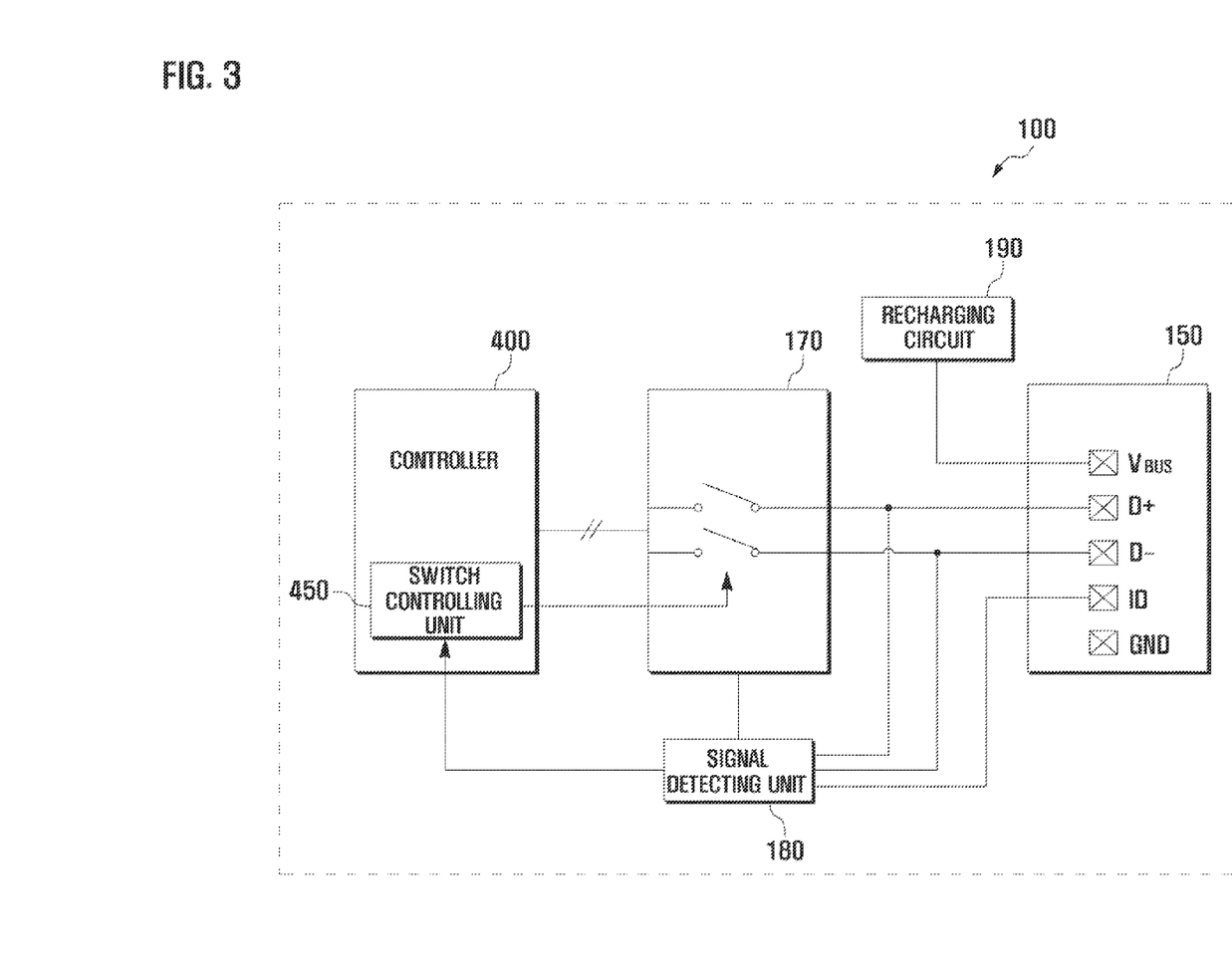
FIG. 3 is a view illustrating a configuration of a Universal Serial Bus (USB) switching circuit in a portable terminal when the USB switching circuit controls modes, according to an exemplary embodiment of the present invention.

FIG. 3 is a view illustrating a configuration of a USB switching circuit in a portable terminal when the USB switching circuit controls modes, according to an exemplary embodiment of the present invention.

Referring to FIG. 3, the USB interface unit 150 is configured to include a connector for connection to an external device and a connector for transmitting a signal to the controller 400. It should be noted that FIG. 3 shows the connector of one type in order to easily understand the features of exemplary embodiments of the present invention. The USB interface unit 150 includes a first signal line (+D) and a second signal line (D−) that are connected to an external device and transmit/receive data signals to/from the external device, a power line (VBUS), connected to the recharging circuit 190, for supplying electric power to a battery of the portable terminal 100 so that the battery can be recharged, an identification line (ID) for receiving an identification signal from a connected external device, and a ground line (GND).

The USB interface unit 150 can transmit data by using the potential difference of signals that flow in the first signal line (D+) and in the second signal line (D−). For example, the first signal line (D+) allows a signal to flow therein that varies (e.g. falling down and rising up) between a high voltage and a certain level of voltage. Similarly, the second signal line (D−) allows a signal to flow therein that varies (e.g. rising up and falling down) between a ground voltage and a certain level of voltage. For example, the first signal line (D+) transmits a signal that varies between 3.3 Volts (V) and 1.5 V, repeatedly. Similarly, the second signal line (D−) transmits a signal that varies between 0 V and 1.5 V, repeatedly.

As shown in FIG. 3, if at least one of the first signal line (D+) and the second signal line (D−) is biased by a pull up voltage, for example, 3.3 V, and is connected to an external device, the pull up voltage is pulled down, i.e., a pull down voltage. It is preferable that a pull up resistor $R_{pu}$ have larger resistance than a resistor R in an external device, so that at least one of the signal lines is connected with an external device and its pull up voltage is pulled down to a pull down voltage.

Referring to FIG. 3, if the first signal line (D+) of the USB interface unit 150 is connected with an external device, such as a headset 200, not a terminal adaptor 300, the portable terminal 100 may supply a pull up voltage to the external device to indicate that the portable terminal 100 has been connected with an external device. For example, if the USB interface unit 150 pulls up a voltage in its line and is connected with an external device, the USB interface unit 150 supplies its pull up voltage to the external device. Therefore, the external device determines that it is connected to the portable terminal 100 and transmits corresponding signals to the first and second signal lines (D+) and (D−). The pull up voltage is in a range of 3.0~3.3 V. It should be understood that the pull up voltage may be differently set according to a type of portable terminal External devices include a pull down resistor $R_{pd}$ according to the USB specification, where the pull down resistor $R_{pd}$ has a resistance in a range of 15 KΩ±5% (14.25~15.75 KΩ). If the portable terminal 100 is connected with an external device via the USB interface unit 150, the portable terminal 100 can perform USB communication with the external device as the pull up resistor $R_{pd}$ is operated in the USB interface unit 150.

The USB switching circuit 170 includes switches that connect/break the signal lines of the USB interface unit 150 to/from the controller 400 in order to stabilize the circuit of the controller 400 when the portable terminal 100 performs data communication with the external device. When the portable terminal 100 performs USB data communication with a particular external device, the USB switching circuit 170 establishes a signal path with a corresponding module of the external device.

The switches of the USB switching circuit 170 are implemented by a charge pump and are switched on/off with respect to the first and second signal lines (D+) and (D−) of the USB interface unit 150. The charge pump is a converter using capacitors that can create either a higher or lower voltage power source. For example, the switching control unit 450 switches off the switches of the USB switching circuit 170 according to a value detected by the signal detector 180, so that the USB switching circuit 170 can be operated in a sleep mode. Similarly, the switching control unit 450 switches on the switches of the USB switching circuit 170 in order to switch from the sleep mode to an active mode of the USB switching circuit 170.

According to the settings, the USB switching circuit 170 controls the switches to be in an OFF state until the portable terminal 100 starts to perform USB data communication with an external device connected thereto, or to be in an ON state only at an initial time when the portable terminal 100 is connected with an external device.

If the switches have been in an OFF state until USB data communication starts, the signal detector 180 can detect a signal, generated in an external device, which is referred to as an external event, from the first and second signal lines (D+) and (D−) of the USB interface unit 150, in order to perform USB data communication. The signal detector 180 can also detect a signal, generated in the portable terminal 100, which is referred to as an internal event, in order to perform USB data communication when the switches are in an OFF state.

The signal detector 180 detects a signal generated when the external device is connected to the portable terminal 100 via the USB interface unit 150 and outputs the detected signal to the controller 400. The signal detector 180 detects a logic level from a signal, detected from the first and second signal lines (D+) and (D−) of the USB interface unit 150, and outputs the detected logic level to the controller 400. The controller 400 can identify a type of external device based on the logic level value. For example, if the logic level is a logic high signal, the controller 400 can identify the external device as a terminal adaptor 300. Similarly, if the logic level is a logic low signal, the controller 400 can identify the external device as a headset 200.

The signal detector 180 detects an identification signal indicating a type of external device from the identification line (ID) of the USB interface unit 150 and outputs the detected identification signal to the controller 400. The controller 400 can identify a type of external device based on the identification signal. For example, external devices may each have a unique identifier. When the external devices are connected to the USB interface unit 150, they transmit identification signals corresponding to their identifiers to the portable terminal 100 via the USB interface unit 150, respectively. The controller 400 detects the identification signal, and identifies whether the connected external device is a terminal adaptor 300 or a headset 200, based on the detected identification signal.

The signal detector 180 can detect a signal for switching a mode of the USB interface unit 150 even in a communication mode where the portable terminal 100 is connected with an external device via the USB interface unit 150 to perform USB data communication. For example, the signal detector 180 detects an external event during the communication mode, where the external event is generated in the first and second signal lines (D+) and (D−) of the USB interface unit 150, and outputs the detected result to the switching control unit 450. The switching control unit 450 determines whether USB data communication is performed in a communication mode, based on the detected result, and switches between the sleep mode and the active mode of the USB switching circuit 170, based on the determined result.

If the portable terminal 100 is connected with a terminal adaptor 300 as an external device, the recharging circuit 190 performs operations related to the recharging of the battery of the portable terminal 100. The recharging circuit 190 controls the amount of recharging current for the recharging of the battery. The recharging circuit 190 can control the battery recharging based on the amount of current flowing in the power line (VBUS) of the USB interface unit 150.

The controller 400 controls the operations of the portable terminal 100 and the signal flow among elements in the portable terminal 100. The elements refer to the RF communication module 110, the input unit 120, the audio processing unit 130, the display unit 140, the storage unit 160, the USB switching circuit 170, the signal detector 180, and the recharging circuit 190. The controller 400 may further include a data processor that includes a codec and at least one modem, which are used to provide a mobile communication service.

The controller 400 receives the detected result from the signal detector 180, identifies a type of external device connected to the USB interface unit 150 based on the detected result, and performs a corresponding operation according to the identified external device. If the controller 400 identifies a headset 200 as an external device, the controller 400 can process signal transmission/reception to perform data communication with the external device via the USB interface unit 150.

If the external device is a terminal adaptor 300, the controller 400 activates a recharging function, so that the battery can be recharged via the USB interface unit 150. If the controller 400 determines that the external device is a network module connectable to a mobile communication network, the controller 400 establishes a communication channel with the mobile communication network via the network module and processes signal transmission/reception in wireless communication.

In an exemplary embodiment of the present invention, the controller 400 receives a detected result from the signal detector 180 and switches a mode of the USB switching circuit 170 to the sleep mode or active mode. For example, when the portable terminal 100 is connected to an external device in a communication mode, and the signal detector 180 detects a transmitted/received signal from the signal path of the USB interface unit 150, the controller 400 controls the operation mode of the USB switching circuit 170.

In the active mode, a certain amount of current (for example, 1 mA) continues to flow in respective switches in the USB switching circuit 170 in order to retain the signal path established with the external device. Therefore, the USB switching circuit 170 is in an activated mode. In the sleep mode, when signal transmission/reception according to data communication does not occur in the signal path established with the external device, a certain amount of current flowing in the USB switching circuit 170 is cut off, so that the respective switches of the USB switching circuit 170 can be switched off Therefore, the USB switching circuit 170 is in a deactivated mode.

As described above, since a certain amount of current continuously flowing in the USB switching circuit 170 can be supplied or cut off by switching a mode according to the signal transmission/reception state, the apparatus and method according to an exemplary embodiment of the present invention can reduce the current consumption in the USB switching circuit 170.

The switching control unit 450 included in the controller 400 may be implemented by a General Purpose Input/Output pin (GPIO) or a detection pin. The switching control unit 450 includes an input pin for receiving detected values from the signal detector 180 and an output pin for controlling the USB switching circuit 170 according to the detected values. The input pin may be the GPIO or the detection pin. The output pin may be the GPIO. The switching control unit 450 switches on/off the USB switching circuit 170 through the output pin, according to the detected value of the signal detector 180.

The switching control unit 450 can receive values (data signals, identification signals, logic level, etc.), detected by the signal detector 180, via the GPIO or the detection pin. The switching control unit 450 can identify the type of external device connected to the USB interface unit 150 according to the detected values, such as an identification signal or a logic level. The switching control unit 450 compares the detected value with the reference data stored in the storage unit 160 and identifies the type of external device that is currently connected to the portable terminal 100. It should be understood that the switching control unit 450 can separate its functions and can be configured in such a way that the separated functions are performed by a detected signal identifying unit and a switching processing unit.

In particular, the switching control unit 450 controls a mode switching of the USB switching circuit 170 according to the detected value of the data signals. When the portable terminal 100 is operated in a communication mode with the external device, the switching control unit 450 controls the operation mode (e.g. sleep mode/active mode) of the USB switching circuit 170 according to the data signal detected by the signal detector 180.

In an exemplary embodiment of the present invention, the controller 400 may include a Universal Asynchronous Receiver/Transmitter (UART) module for processing signals of an external device, which are transmitted via the USB switching control unit 450. The UART module may be implemented with a microchip in which a program is installed to control an interface toward serial devices mounted on the portable terminal 100.

The UART module may further include a UART bus module that converts a serial signal of an external device into a parallel signal, so that the signal transmitted from the external device can be rapidly processed in the portable terminal 100, and converts the parallel signal output from the portable terminal 100 into a serial signal. For example, the UART module coverts a byte stream, transmitted from the portable terminal 100 via a parallel circuit, into a bit stream to be transmitted to the external device. The UART module also converts a serial bit stream transmitted from the external device into a byte stream, so that the portable terminal 100 can process the byte stream.

In the following description, the operations of the USB interface unit 150, the USB switching circuit 170, the signal detector 180, and the switching control unit 450 are explained when the portable terminal 100 is connected with an external device.

When a terminal adaptor 300 is connected to the USB interface unit 150, the elements included in the portable terminal 100 are operated as follows.

Since the first and second signal lines (D+) and (D−) of the terminal adaptor 300 are shorted, the signal detector 180 detects a logic high signal from the first and second signal lines (D+) and (D−) and outputs a result of the detection to the switching control unit 450. The switching control unit 450 receives the logic high signal via the GPIO or the detection pin. Since the first and second signal lines (D+) and (D−) of the terminal adaptor 300 are shorted, the signal detector 180 supplies a certain level of voltage, High, to the first signal line (D+) of the USB interface unit 150. After that, if the voltage, High, is detected from the second signal line (D−), the controller 400 determines that a terminal adaptor 300 is currently connected to the portable terminal 100. Therefore, the portable terminal 100 can be operated in a recharging mode according to the connection of the terminal adaptor 300.

When a USB external device, such as a headset 200, is connected to the USB interface unit 150, the elements of the portable terminal 100 are operated as described below.

The first and second signal lines (D+) and (D−) of the external device are connected with a pull down register $R_{pd}$, 15 KΩ, for example. The first signal line (D+) of the USB interface unit 150 is biased to a particular voltage. For example, the signal detector 180 supplies a voltage, High, to the first signal line (D+) of the USB interface unit 150. After that, if a voltage, Low, is detected from the second signal line (D−), the controller 400 determines that the voltage of the first signal line is supplied to the external device, and thus identifies the type of external device connected thereto.

Also, when the signal detector 180 detects the change of a voltage set in the first and second signal lines (D+) and (D−) and outputs the detected result to the switching control unit 450, the switching control unit 450 may identify the type of external device according to the change of the preset voltage. For example, the switching control unit 450 compares the reference data, stored in the storage unit 160, with the detected value and identifies which type of external device is currently connected to the portable terminal 100.

Furthermore, the signal detector 180 detects an identification signal, supplied to the USB interface unit 150, from the identification line ID of the external device and identifies the type of external device. Therefore, the portable terminal 100 establishes a signal path corresponding to the identified external device and performs a corresponding operation in a communication mode.

When the portable terminal 100 is operated in the communication mode with the external device, the signal detector 180 checks the first and second signal lines (D+) and (D−) of the USB interface unit 150 using the processes as described above. After that, the signal detector 180 checks a particular data signal and outputs the result to the switching control unit 450.

The switching control unit 450 determines whether data communication is performed in the communication mode, based on the detected signal of the signal detector 180. If the switching control unit 450 determines that data communication is not performed, the switching control unit 450 outputs a command signal for deactivating the USB switching circuit 170 to the USB switching circuit 170. The command signal is used to control the switching to a sleep mode of the USB switching circuit 170. In the sleep mode, the USB switching circuit 170 breaks a signal path that is set to the corresponding external device by the control of the switching control unit 450. For example, the USB switching circuit 170 switches off the switches that are connected to the first and second signal lines (D+) and (D−) of the USB interface unit 150, respectively.

When the USB switching circuit 170 is operated in a sleep mode, the signal detector 180 checks the first and second signal lines (D+) and (D−) of the USB interface unit 150. If the signal detector 180 detects a particular data signal from the lines, the signal detector 180 outputs the detected value to the switching control unit 450. The switching control unit 450 outputs a command signal for activating the USB switching circuit 170 to the USB switching circuit 170, according to the detected signal of the signal detector 180. The command signal is used to control the switching from a sleep mode to an active mode of the USB switching circuit 170. Therefore, the USB switching circuit 170 switches the sleep mode to an active mode and outputs a signal, transmitted via the USB interface unit 150, to the corresponding signal path.

The switching control unit 450 can also control the operation mode of the USB switching circuit 170, according to a data signal generated in the portable terminal 100, in the communication mode. For example, when a data signal to be transmitted from the portable terminal 100 to the external device is generated in a sleep mode of the USB switching circuit 170, the switching control unit 450 outputs a command signal for activating the USB switching circuit 170 to the USB switching circuit 170. The command signal is used to control the switching to an active mode of the USB switching circuit 170. Therefore, the USB switching circuit 170 switches the sleep mode to the active mode. After that, the USB switching circuit 170 establishes a signal path connected to the external device and transmits a data signal of the portable terminal 100 to the external device via the USB interface unit 150.

Although FIGS. 2 and 3 schematically show an exemplary embodiment according to the portable terminal of the present invention in order to clearly understand the features of the present invention, it should be understood that the present invention is not limited to the embodiment.

According to the type of portable terminal, the portable terminal 100 according to an exemplary embodiment of the present invention may further include a digital broadcast receiving module, a short-range communication module, an Internet communication module, a music reproducing module, etc. It will be appreciated that the exemplary embodiment can be modified in such a way that parts of the elements in the portable terminal as described above may be omitted or replaced with other elements.

For example, if the portable terminal 100 is implemented to support short-range communication, such as Bluetooth or Zigbee, etc., the portable terminal 100 may include a short-range communication module, so that the short-range communication module can perform short-range communication with other portable terminals according to the control of the controller 400. If the portable terminal 100 is implemented to support communication via an Internet network, the portable terminal 100 may include an Internet communication module, so that the Internet communication module can be wirelessly communicated with the other portable terminals and the network systems, via the Internet network, according to the control of the controller 400. Furthermore, if the portable terminal 100 is implemented to provide functions related to digital broadcasting, the portable terminal 100 may include a broadcast receiving module.

In the foregoing description, the configuration and operations of the portable terminal 100 have been explained. In the following description, a method is explained in detail that controls a mode switching of the USB switching circuit 170 when the portable terminal 100 is operated in a communication mode with an external device. It should be understood that the present invention is not limited to the following exemplary embodiments. It will be appreciated that there are many modifications that might be made to the exemplary the embodiments.

Figure 4:
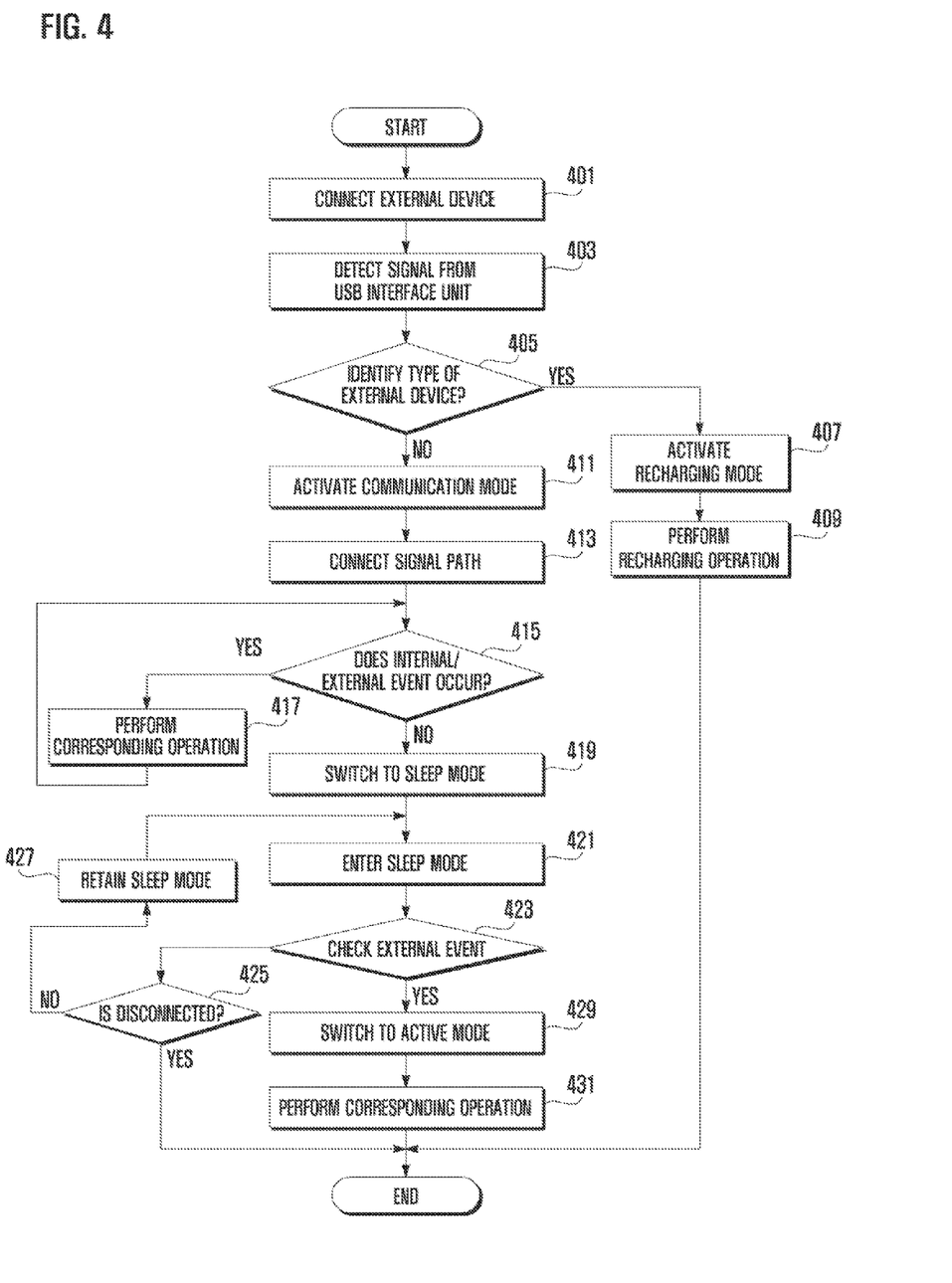
FIG. 4 is a flowchart describing a method for controlling the mode switching operation in a USB switching circuit according to an exemplary embodiment of the present invention.

FIG. 4 is a flowchart describing a method for controlling the mode switching operation in a USB switching circuit according to an exemplary embodiment of the present invention.

Referring to FIG. 4, when the portable terminal 100 is connected with a particular external device via the USB interface unit 150 in step 401, a signal from the USB interface unit 150 is detected in step 403. After that, the portable terminal 100 identifies a type of external device according to the detected signal in step 405. The signal detector 180 detects a signal generated in the USB interface unit 150, and outputs the detected value to the switching control unit 450, where the detected value is extracted from the detected signal by one of the detecting methods described above. The switching control unit 450 identifies a type of external device based on the detected value.

If the portable terminal 100 determines that the identified external device is a terminal adaptor at step 405, the portable terminal 100 activates a recharging mode in step 407, and recharges the battery in the recharging mode in step 409.

On the contrary, if the portable terminal 100 determines that the identified external device is a USB communication device at step 405, the portable terminal 100 activates a communication mode in step 411, and establishes a signal path to perform a function corresponding to the USB communication device in the communication mode in step 413. After that, the controller determines whether an event occurs inside the portable terminal or outside the portable terminal, such as in the USB communication device, via the established signal path in step 415.

The occurrence of the event can be determined by detecting a signal of the first and second signal lines (D+) and (D−) of the USB interface unit 150. For example, if the level of the detected signal is equal to or greater than a preset critical value, the controller determines that an event has occurred. On the contrary, if the level of the detected signal is less than a preset critical value, the controller determines that an event does not occur.

If the controller determines that an event (for example, data signal transmission/reception) has occurred inside or outside at step 415, the controller transmits or receives the data signal through the established signal path and performs a corresponding operation according thereto in step 417. On the contrary, if the controller determines that an event does not occur at step 415, the switching control unit 450 switches the current mode to a sleep mode of the USB switching circuit 170 that provides a signal path to perform USB communication in step 419.

The USB switching circuit 170 enters a sleep mode in step 421, and the signal detector 180 determines whether an external event occurs on the respective signal lines of the USB interface unit 150 in step 423. If the signal detector 180 determines that an external event does not occur on the respective signal lines at step 423, the portable terminal determines if there is a disconnection with the external device in step 425. If the portable terminal 100 detects the disconnection with the external device at step 425, the USB switching circuit 170 is retained in the sleep mode in step 427 and returns to step 423. On the contrary, if the portable terminal 100 detects the disconnection with the external device at step 425, the portable terminal 100 terminates the procedure. When the portable terminal 100 is disconnected with the external device, the USB switching circuit 170 may be deactivated.

On the contrary, if the signal detector 180 determines that an external event has occurred on the respective signal lines at step 423, the signal detector 180 switches the sleep mode into an active mode of the USB switching circuit 170 in step 429. After that, the portable terminal 100 receives data signals from the external device in the active mode of the USB switching circuit 170, and processes the received data signals through a corresponding internal module and the established signal path in step 431. The internal module performs USB communication with the external device.

Although it is not shown in FIG. 4, the switching control unit 450 can determine whether an internal event occurs in the portable terminal 100 when the USB switching circuit 170 is operated in a sleep mode. If the internal event has occurred, the switching control unit 450 switches the sleep mode into an active mode of the USB switching circuit 170. In that case, the portable terminal 100 transmits its data signals to the external device, via the USB switching circuit 170 and the USB interface unit 150, in the active mode.

As described above, the apparatus and method for controlling an operation mode of a USB switching circuit, according to exemplary embodiments of the present invention, can correctly identify the type of external device connected to a portable terminal and can adaptively switch the operation mode of the USB switching circuit according to the occurrence of the signal transmitted and received between the portable terminal and the external device connected thereto. If there is no signal transmitted and received between the portable terminal and the external device, the USB switching circuit is switched to a sleep mode, thereby reducing the current consumption. If a signal transmitted and received between the portable terminal and the external device is detected during the sleep mode, the USB switching circuit is switched from the sleep mode to an active mode, thereby achieving low power consumption and highly reliable communication.

While the invention has been shown and described with reference to certain exemplary embodiments thereof, it will be understood by those skilled in the art that various changes in form and detail may be made therein without departing from the spirit and scope of the invention as defined in the appended claims and their equivalents.

What is claimed is:

1. An apparatus for controlling a switching circuit in a portable terminal, the apparatus comprising:
    a connector interface unit, connected with an external device, for transmitting signals between the portable terminal and the external device;
    a switching circuit for one of connecting and disconnecting signal lines with the connector interface unit to respectively one of establish and break a signal path between the external device and a corresponding internal module used to perform data communication;
    a signal detector for detecting a signal generated upon the external device being connected to the connector interface unit, to output a first detected value corresponding to the detected signal, and for detecting an external event from the external device while the external device is connected to the connector interface unit and the portable terminal is operated in the communication mode with the external device, to output a second detected value corresponding to the detected external event; and
    a controller for identifying a type of the external device according to the first detected value upon the external device being connected to the connector interface unit, for activating the communication mode of the portable terminal with the external device according to the identified type of the external device, and for switching between at least active and sleep modes of the switching circuit according to the second detected value while the external device is connected to the connector interface unit and the portable terminal is operated in the communication mode with the external device,
    wherein, during the active mode, the signal path between the external device and the corresponding internal module is established, and during the sleep mode, the signal path between the external device and the corresponding internal module is broken.

2. The apparatus of claim 1, wherein, if the controller determines that the external event has not occurred according to the second detected value during the communication mode, the controller switches the mode of the switching circuit to the sleep mode.

3. The apparatus of claim 2, wherein, if an internal event corresponding to a transmission from the portable terminal to the external device has not occurred during the communication mode, the controller switches the mode of the switching circuit to the sleep mode.

4. The apparatus of claim 3, wherein, if the controller detects the internal or external event during the sleep mode of the switching circuit, the controller switches the mode of the switching circuit from the sleep mode to the active mode.

5. The apparatus of claim 4, wherein the controller controls the mode of the switching circuit by controlling an amount of electrical current, required to operate the switching circuit, according to the second detected value.

6. The apparatus of claim 1, wherein the controller comprises a switching control unit for identifying the type of the connected external device according to the determination of the first detected value, and for generating a signal to switch the mode of the switching circuit according to the determination of the second detected value.

7. The apparatus of claim 6, wherein:
    the controller controls the switching circuit to be operated in the sleep mode if the controller determines, according to the second detected value, that data communication is not performed during the communication mode; and
    the controller switches from the sleep mode to the active mode if the controller determines, according to the second detected value, that data communication is performed during the sleep mode.

8. The apparatus of claim 6, wherein the switching control unit switches from the sleep mode to the active mode when the switching control unit detects a signal transmitted from the portable terminal to the external device during the sleep mode.

9. The apparatus of claim 1, wherein the signal detector detects the external event from the signal lines of the connector interface unit in either of the at least sleep and active modes of the switching circuit.

10. The apparatus of claim 1, wherein the connector interface unit comprises:
- a first signal line and a second signal line, connected to the external device, for transmitting data signals between the portable terminal and the external device;
- a power line, connected to a recharging circuit of the portable terminal, for supplying electric power to a battery of the portable terminal;
- an identification line for receiving an identification signal from the connected external device; and
- a ground line.

11. The apparatus of claim 1, wherein if the controller identifies that the type of the external device corresponds to a terminal adaptor, the controller controls a recharging circuit of the portable terminal to charge a battery of the portable terminal in a recharging mode using electric power supplied to the USB interface unit from the terminal adaptor.

12. The apparatus of claim 1, wherein if the controller identifies the type of the external device based on an identification signal received from the external device by the connector interface unit.

13. A method for controlling a switching circuit in a portable terminal, the method comprising:
- detecting, upon an external device being connected to a connector interface unit, a signal from the connector interface unit and identifying a type of external device according to the detected signal;
- activating a communication mode according to the detected signal, and establishing a signal path between an internal module and the external device during the communication mode while the external device is connected to the connector interface unit;
- determining whether at least one of an internal event occurs in the portable terminal and an external event occurs in the external device, during the communication mode while the external device is connected to the connector interface unit; and
- switching from an active mode of a switching circuit to a sleep mode of the switching circuit if at least one of the internal and external events has not occurred,
- wherein, during the active mode, the signal path between the internal module and the external device is established, and during the sleep mode, the signal path between the internal module and the external device is broken.

14. The method of claim 13, wherein the determining of whether the external event occurs comprises:
- detecting another signal from the connector interface unit during the communication mode while the external device is connected to the connector interface unit;
- determining, if the detected other signal has a voltage equal to or greater than a threshold value, that the external event has occurred; and
- determining, if the detected other signal has a voltage less than a threshold value, that the external event has not occurred.

15. The method of claim 13, further comprising:
switching, if the at least one of the internal and the external event is detected during the sleep mode, from the sleep mode to the active mode.

16. The method of claim 15, further comprising:
- determining whether an external event occurs during the sleep mode;
- retaining, if an external event has not occurred, the sleep mode; and
- switching, if an external event has occurred, from the sleep mode to the active mode.

17. The method of claim 13, further comprising:
- activating a recharging mode if the external device comprises a terminal adaptor; and
- recharging a battery of the portable terminal in the recharging mode.

18. The method of claim 13, wherein the identifying of the type of the external device is based on an identification signal received from the external device.

* * * * *